United States Patent
Hwang et al.

(10) Patent No.: US 9,888,431 B2
(45) Date of Patent: Feb. 6, 2018

(54) METHOD FOR DETECTING SMALL CELL ON BASIS OF DISCOVERY SIGNAL

(71) Applicant: LG ELECTRONICS INC., Seoul (KR)

(72) Inventors: Daesung Hwang, Seoul (KR); Joonkui Ahn, Seoul (KR); Yunjung Yi, Seoul (KR); Bonghoe Kim, Seoul (KR); Dongyoun Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 224 days.

(21) Appl. No.: 14/760,657

(22) PCT Filed: Nov. 26, 2013

(86) PCT No.: PCT/KR2013/010758
§ 371 (c)(1),
(2) Date: Jul. 13, 2015

(87) PCT Pub. No.: WO2014/109478
PCT Pub. Date: Jul. 17, 2014

(65) Prior Publication Data
US 2015/0373628 A1    Dec. 24, 2015

Related U.S. Application Data

(60) Provisional application No. 61/752,394, filed on Jan. 14, 2013, provisional application No. 61/781,021, filed on Mar. 14, 2013.

(51) Int. Cl.
*H04W 48/16*    (2009.01)
*H04W 48/10*    (2009.01)
(Continued)

(52) U.S. Cl.
CPC ........... *H04W 48/16* (2013.01); *H04W 48/10* (2013.01); *H04W 48/06* (2013.01); *H04W 48/12* (2013.01); *H04W 84/045* (2013.01)

(58) Field of Classification Search
CPC ..... H04W 48/06; H04W 48/10; H04W 48/12; H04W 48/16; H04W 84/045
See application file for complete search history.

(56) References Cited

U.S. PATENT DOCUMENTS

2010/0142476 A1* 6/2010 Jiang .................. H04L 5/0051
                                                370/330
2011/0190022 A1    8/2011 Rudrapatna
(Continued)

FOREIGN PATENT DOCUMENTS

| KR | 10-2012-0138063 A | 12/2012 |
| WO | WO 2011/109166 A1 | 9/2011 |
| WO | WO 2013/005105 A2 | 1/2013 |

*Primary Examiner* — Edan Orgad
*Assistant Examiner* — Nourali Mansoury
(74) *Attorney, Agent, or Firm* — Birch, Stewart, Kolasch & Birch, LLP

(57) ABSTRACT

According to one embodiment of the present invention, provided is a method by which a terminal detects a small cell. The small cell detection method can comprise the steps of: receiving, from a serving cell, information on discovery signals of one or a plurality neighboring small cells; and detecting a discovery signal from a small cell in an off state from the one or plurality of neighboring small cells on the basis of the information on the discovery signals. The information on the discovery signals can include information on whether the small cells independently set the discovery signals or identically set the discovery signals by cluster unit.

11 Claims, 14 Drawing Sheets

(51) Int. Cl.
  *H04W 84/04* (2009.01)
  *H04W 48/06* (2009.01)
  *H04W 48/12* (2009.01)

(56) References Cited

U.S. PATENT DOCUMENTS

| | | |
|---|---|---|
| 2012/0263145 A1 | 10/2012 | Marinier et al. |
| 2013/0012212 A1* | 1/2013 | Murakami .......... H04W 36/245 455/439 |
| 2013/0083744 A1* | 4/2013 | Peng .................... H04W 52/04 370/329 |
| 2014/0038598 A1* | 2/2014 | Ren ...................... H04W 48/16 455/434 |
| 2014/0086173 A1* | 3/2014 | Sadeghi ................ H04L 5/005 370/329 |
| 2014/0192738 A1* | 7/2014 | Nam ..................... H04L 5/001 370/329 |
| 2014/0192740 A1* | 7/2014 | Ekpenyong ........... H04L 5/0035 370/329 |
| 2014/0378125 A1* | 12/2014 | Bromell ............... H04W 60/02 455/422.1 |

* cited by examiner

METHOD FOR DETECTING SMALL CELL ON BASIS OF DISCOVERY SIGNAL

CROSS REFERENCE TO RELATED APPLICATIONS

This application is the National Phase of PCT International Application No. PCT/KR2013/010758, filed on Nov. 26, 2013, which claims priority under 35 U.S.C. 119(e) to U.S. Provisional Application No. 61/752,394, filed on Jan. 14, 2013 and 61/781,021, filed on Mar. 14, 2013, all of which are hereby expressly incorporated by reference into the present application.

BACKGROUND OF THE INVENTION

Field of the Invention

The present invention relates to a method of detecting a small cell on the basis of a discovery signal.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in a next-generation mobile communication system, it is expected that a small cell of which a cell coverage radius is small is added in macro cell coverage.

However, since it is expected that such a small cell is deployed with a high density, there is a disadvantage in that interference may be increased. To solve this problem, it can be improved so that the small cell is temporarily off and is then on according to an interference amount.

However, since a user equipment (UE) cannot detect the small cell in a state where the small cell is temporarily off, there is a problem in that a fast connection cannot be achieved even if the small cell is on again at a later time.

SUMMARY OF THE INVENTION

Accordingly, a disclosure of the present specification aims to solve the aforementioned problem.

In order to achieve the aforementioned purpose, specifically, according to one disclosure of the present specification, a small cell which can be temporarily off or on can transmit a discovery signal, and a serving cell of a user equipment (UE) can report information regarding the discovery signal of the small cell to the UE thereof.

More specifically, according to one disclosure of the present specification, there is provided a method for detecting a small cell. The method may comprise: receiving, from a serving cell, information on discovery signals from one or a plurality neighbor small cells; and detecting a discovery signal from a small cell in an off state among the one or the plurality of neighbor small cells on the basis of the information on the discovery signals. Here, the information on the discovery signals may include information on whether the small cells independently configure the discovery signals or identically configure the discovery signals in unit of a cluster.

The information on the discovery signal may include one or more of a transmission timing of the discovery signal, physical resource block (PRB) mapping of the discovery signal, subcarrier mapping of the discovery signal, a generation sequence parameter of the discovery signal, cell loading, whether a control plane/user plane is supported, whether an overlap with a macro cell coverage occurs, and information for distinguishing a type of a cell in which the discovery signal is transmitted.

The information on the discovery signal may further include one or more of information on whether a corresponding small cell transmits the discovery signal with a specific period, information on whether the discovery signal is transmitted according to an on or off state of the small cell, information on whether the discovery signal is transmitted according to loading of the small cell, and information on whether a transmission status as to whether transmission is performed or not is reported through a higher layer signal.

The information on the discovery signal may include an index for one of several pieces of information on the discovery signal.

The discovery signal may be generated by each of small cells on the basis of a physical cell identifier (ID), a cluster ID, an access type, a cyclic prefix (CP) length, priority information of a cell, and information on cell loading. The information on cell loading may be a resource usage rate, and the discovery signal is generated differently according to the resource usage rate. Also, one or a plurality of small cells belonging to the same cluster may generate the discovery signal equally on the basis of the cluster ID.

The discovery signal may be received at the same timing from the one or the plurality of neighbor small cells.

A plurality of discovery signals received at the same timing may be subjected to code division multiplexing (CDM), and are received during a plurality of OFDM symbols or subframes.

The discovery signal may have a CP length longer than that of a physical channel comprising a PUSCH, a PDSCH, and a PDCCH.

Measurements may be performed on each small cell by using the discovery signal, or measurement is performed in unit of a cluster.

If the discovery signal is received from a small cell in the off state, a reference signal may be received together from the small cell in the off state.

According to one disclosure of the present specification, in a situation where small cells are deployed with a high density, one or more small cells are temporarily off, thereby being able to avoid an increase in interference. In addition, the small cell which is temporarily off transmits a discovery signal, so that a user equipment (UE) can rapidly detect the small cell. In addition, the serving cell of the UE transmits information regarding a discovery signal of neighbor small cells to the UE thereof, so that the UE can rapidly detect the discovery signal from the neighbor small cells.

DESCRIPTION OF EXEMPLARY EMBODIMENTS

Figure 1:
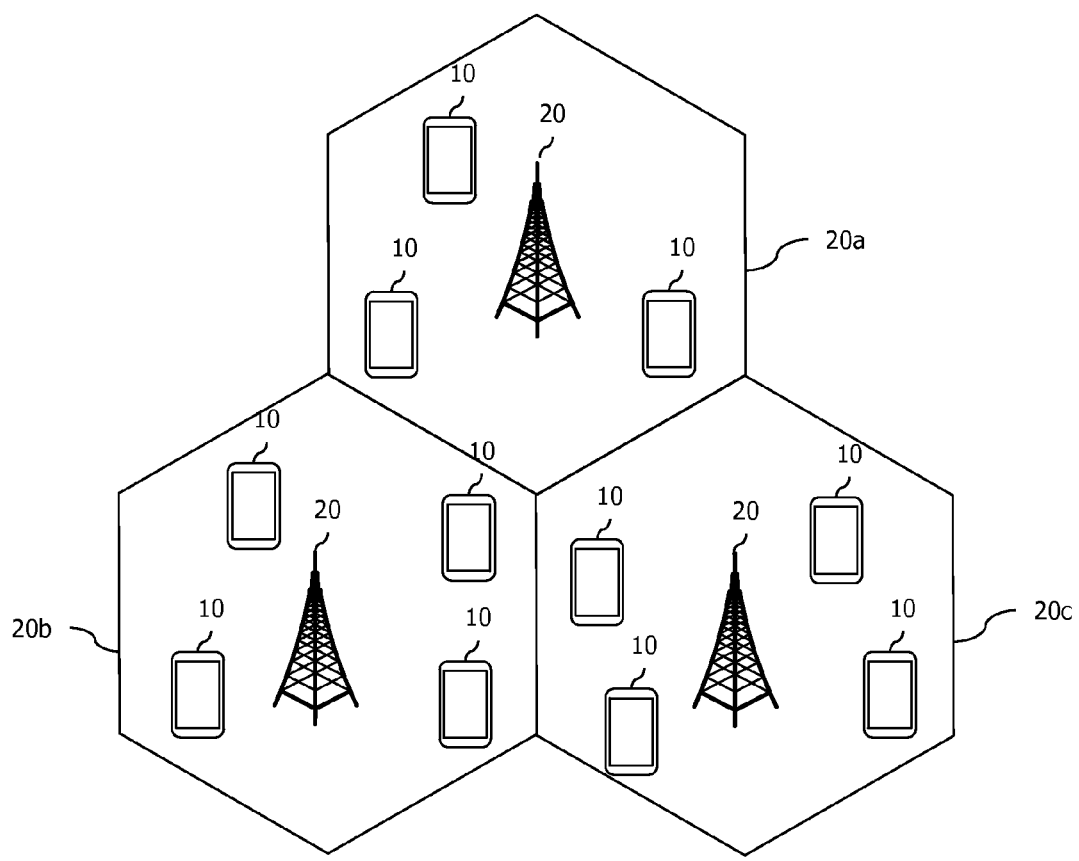
FIG. 1 shows a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

The wireless device may be served by a plurality of serving cells. Each serving cell may be defined as a downlink (DL) component carrier (CC) or a pair of the DL CC and an uplink (UP) CC.

The serving cell may be divided into a primary cell and a secondary cell. The primary cell is a cell which operates at a primary frequency, and performs an initial connection establishment process, starts a connection reestablishment process, or is designated as the primary cell during a handover process. The primary cell is also referred to as a reference cell. The secondary cell operates at a secondary frequency, may be set after an RRC (Radio Resource Control) connection is established, and may be used to provide an additional radio resource. At least one primary cell may be continuously set, and the secondary cell may be add/modified/cancelled by higher layer signaling (e.g., an RRC message).

A cell index (CI) of the primary cell may be fixed. For example, a lowest CI may be designated as the CI of the primary cell. Hereinafter, the CI of the primary cell is 0, and CIs of the secondary cell are sequentially allocated from 1.

FIG. 1 shows a wireless communication system.

The wireless communication system includes at least one base station (BS) 20. Respective BSs 20 provide a communication service to particular geographical areas 20a, 20b, and 20c (which are generally called cells). Each cell may be divided into a plurality of areas (which are called sectors). User equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 20 generally refers to a fixed station that communicates with the UE 10 and may be called by other names such as evolved-NodeB (eNB), base transceiver system (BTS), access point (AP), etc.

The UE generally belongs to one cell and the cell to which the UE belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
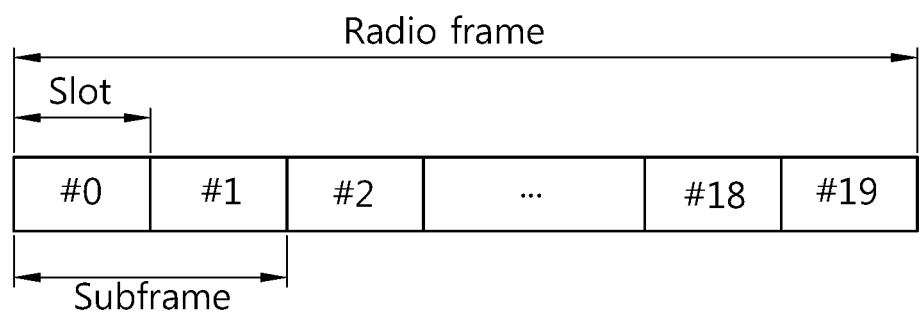
FIG. 2 shows a downlink radio frame structure according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The section 5 of 3GPP TS 36.211 V8.2.0 (2008-03) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
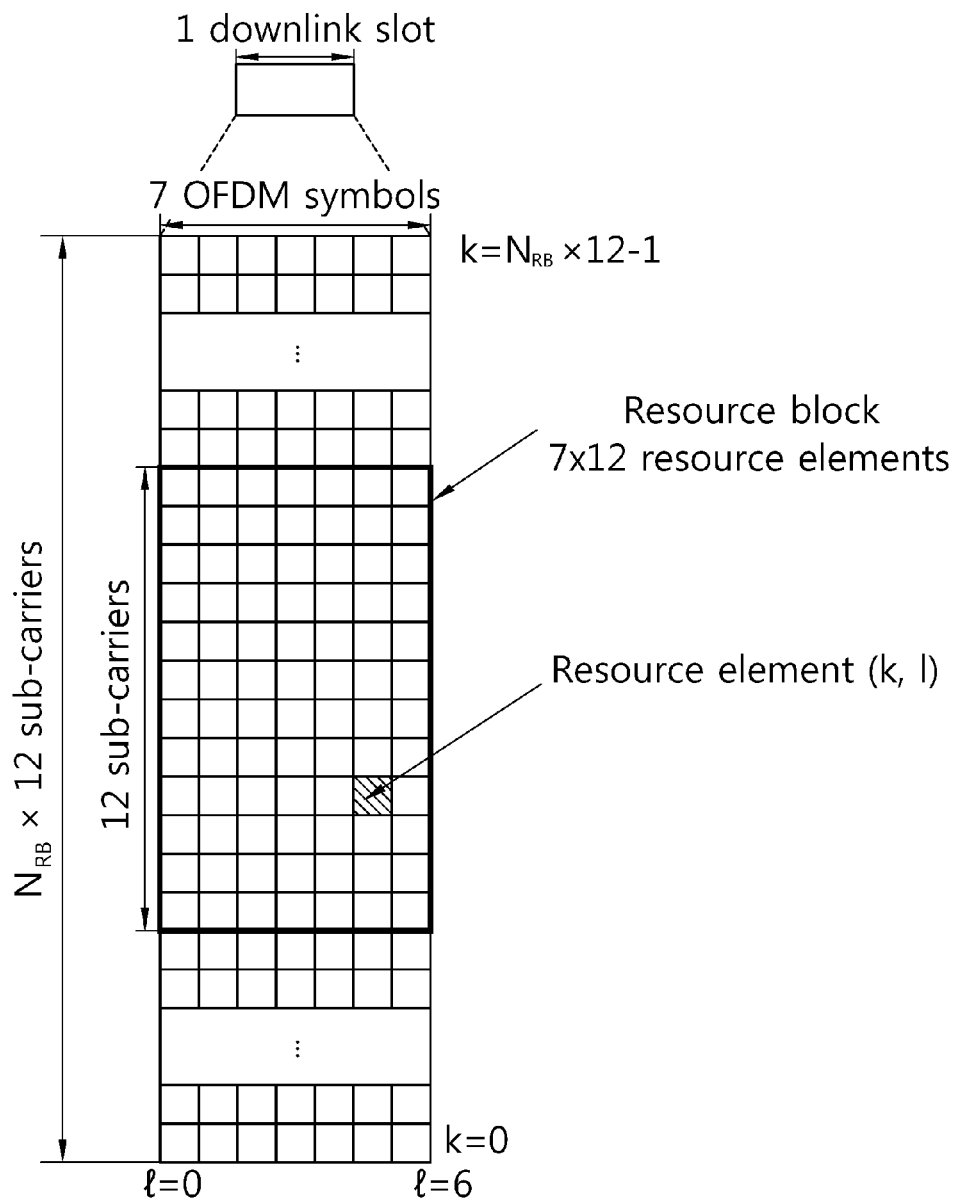
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
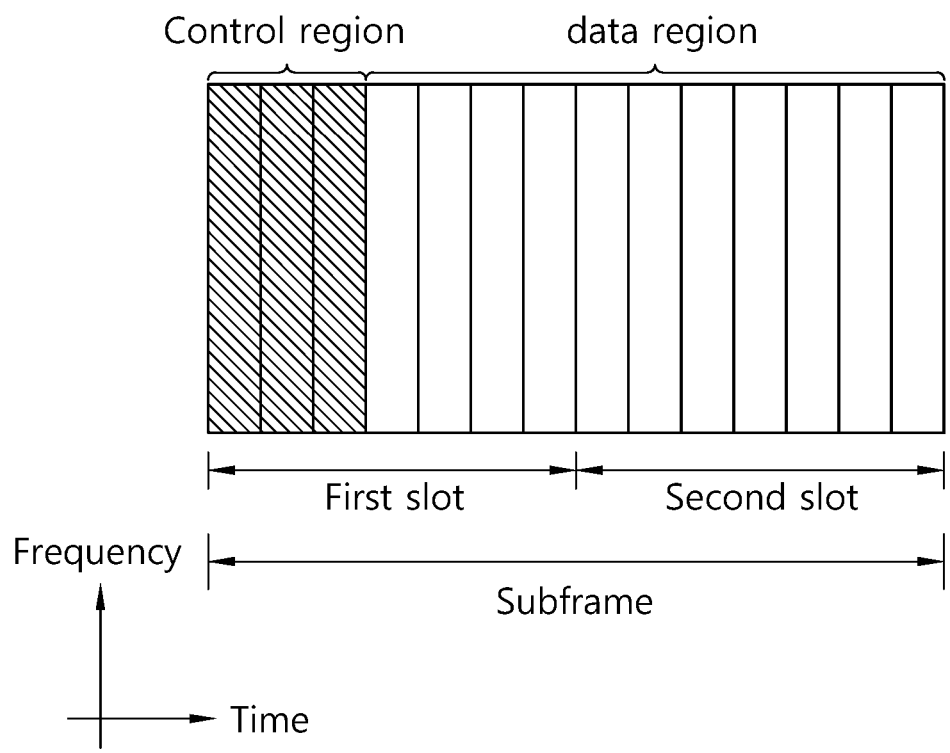
FIG. 4 illustrates the architecture of a downlink sub-frame.

FIG. 4 illustrates the architecture of a downlink subframe.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 4, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 5:
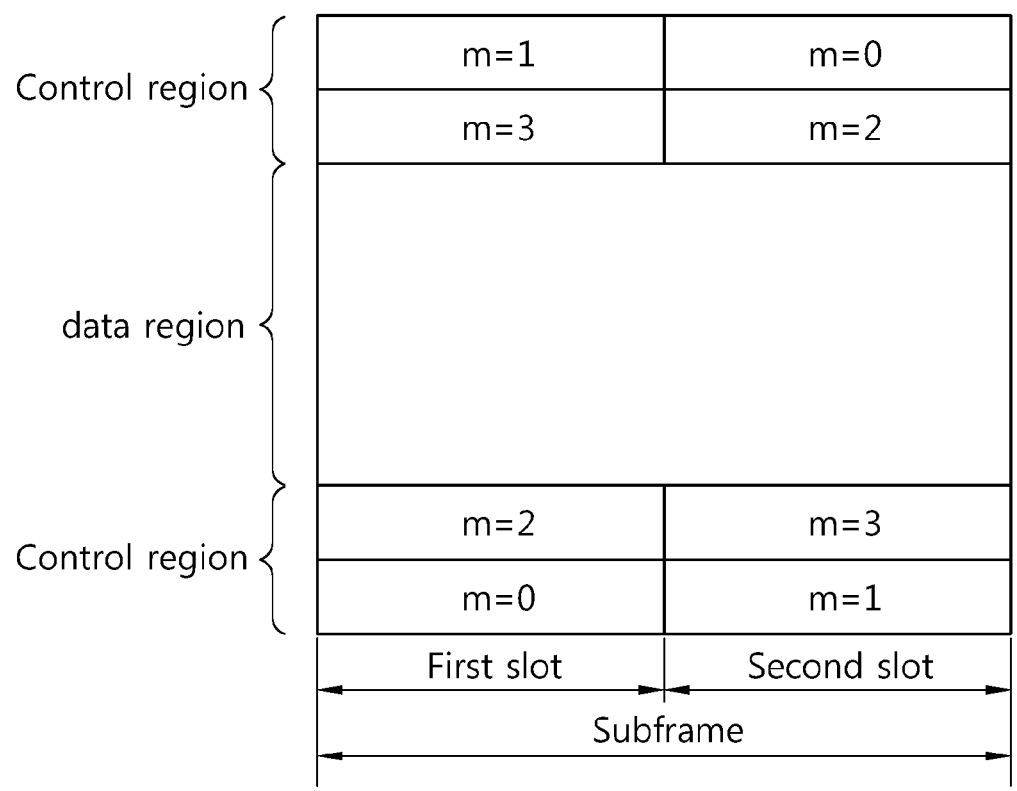
FIG. 5 illustrates the architecture of an uplink sub-frame in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

A carrier aggregation system is now described.

Figure 6:
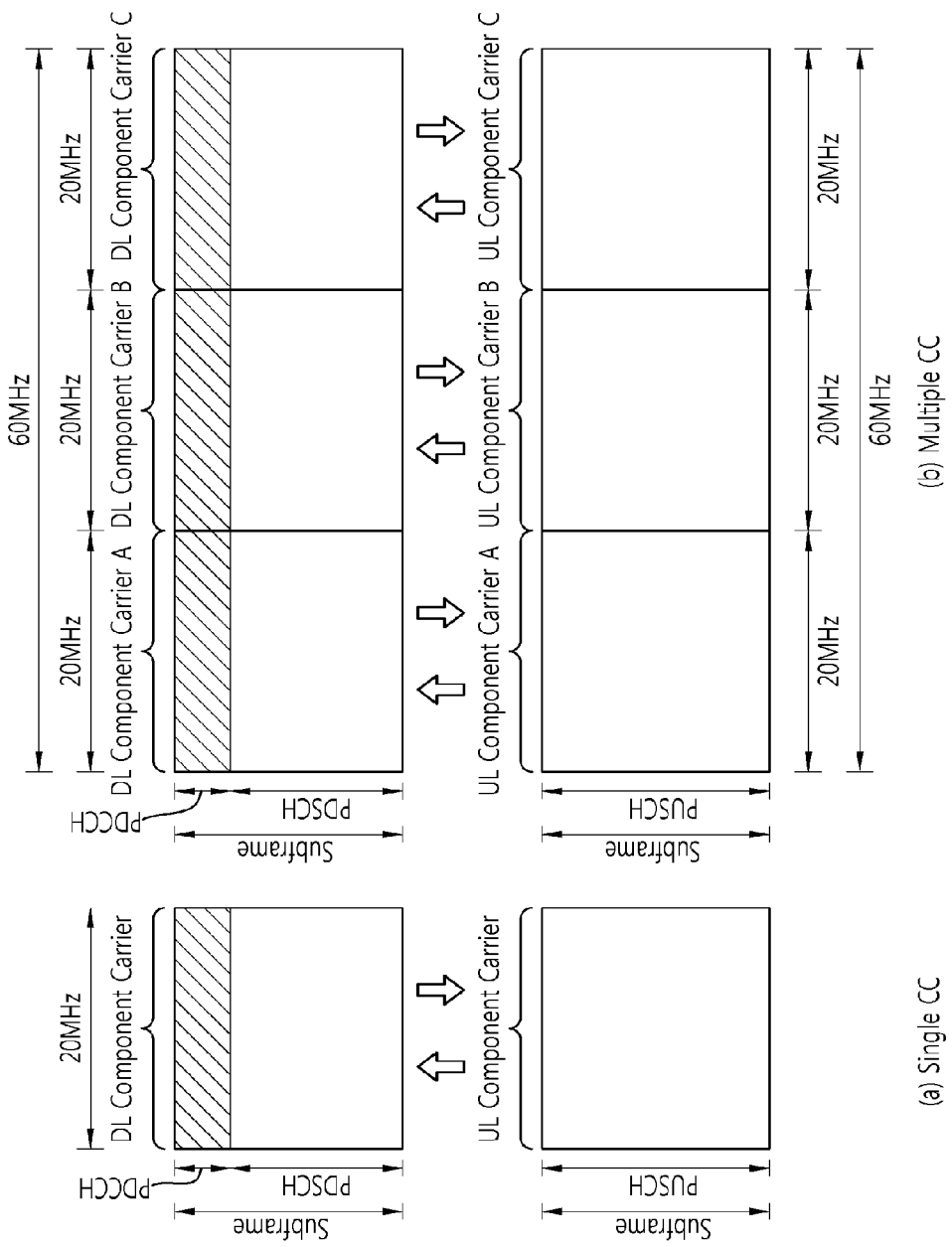
FIG. 6 illustrates an example of comparison between a single carrier system and a carrier aggregation system.

FIG. 6 illustrates an example of comparison between a single carrier system and a carrier aggregation system.

Referring to FIG. 6, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

The PCC (primary component carrier) means a component carrier (CC) corresponding to the primary cell. The PCC is, among several CCs, the one where the terminal initially achieves connection or RRC connection with the base station. The PCC is a special CC that is in charge of connection or RRC connection for signaling regarding multiple CCs and manages terminal context information (UE context) that is connection information related with the terminal. Further, the PCC achieves connection with the terminal, so that the PCC is always left in the activation state when in RRC connected mode. The downlink component carrier corresponding to the primary cell is denoted downlink primary component carrier (DL PCC) and the uplink component carrier corresponding to the primary cell is denoted uplink primary component carrier (UL PCC).

The SCC (secondary component carrier) means a CC corresponding to a secondary cell. That is, the SCC is a CC other than the PCC, which is assigned to the terminal and is an extended carrier for the terminal to perform additional resource allocation in addition to the PCC. The SCC may be left in activation state or deactivation state. The downlink component carrier corresponding to the secondary cell is denoted downlink secondary component carrier (DL SCC) and the uplink component carrier corresponding to the secondary cell is denoted uplink secondary component carrier (UL SCC).

The primary cell and the secondary cell have the following characteristics.

First, the primary cell is used for transmitting a PUCCH. Second, the primary cell is always left activated while the secondary cell may be activated/deactivated depending on a specific condition. Third, when the primary cell experiences a radio link failure (hereinafter, 'RLF'), RRC re-connection is triggered. Fourth, the primary cell may be varied by a handover procedure that comes with an RACH (random access channel) procedure or by altering a security key. Fifth, NAS (non-access stratum) information is received through the primary cell. Sixth, in the FDD system, the primary cell has always a pair of a DL PCC and a UL PCC. Seventh, a different component carrier (CC) may be set as a primary cell in each terminal. Eighth, the primary cell may be replaced only through a handover or cell selection/cell re-selection procedure. In adding a new serving cell, RRC signaling may be used to transmit system information of a dedicated serving cell.

When configuring a serving cell, a downlink component carrier may form one serving cell or a downlink component carrier and an uplink component carrier form a connection to thereby configure one serving cell. However, a serving cell is not configured with one uplink component carrier alone.

Activation/deactivation of a component carrier is equivalent in concept to activation/deactivation of a serving cell. For example, assuming that serving cell 1 is constituted of DL CC1, activation of serving cell 1 means activation of DL CC1. If serving cell2 is configured by connection of DL CC2 and UL CC2, activation of serving cell2 means activation of DL CC2 and UL CC2. In this sense, each component carrier may correspond to a serving cell.

The number of component carriers aggregated between uplink and downlink may vary. When the number of downlink CCs is the same as the number of uplink CCs is denoted symmetric aggregation, and when the numbers differ from each other is denoted asymmetric aggregation. Further, the sizes (i.e., bandwidth) of CCs may be different from each other. For example, when five CCs are used to configure a 70 MHz band, the configuration may be made as follows: 5 MHz CC (carrier #0)+20 MHz CC (carrier #1)+20 MHz CC (carrier #2)+20 MHz CC (carrier #3)+5 MHz CC (carrier #4).

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 7:
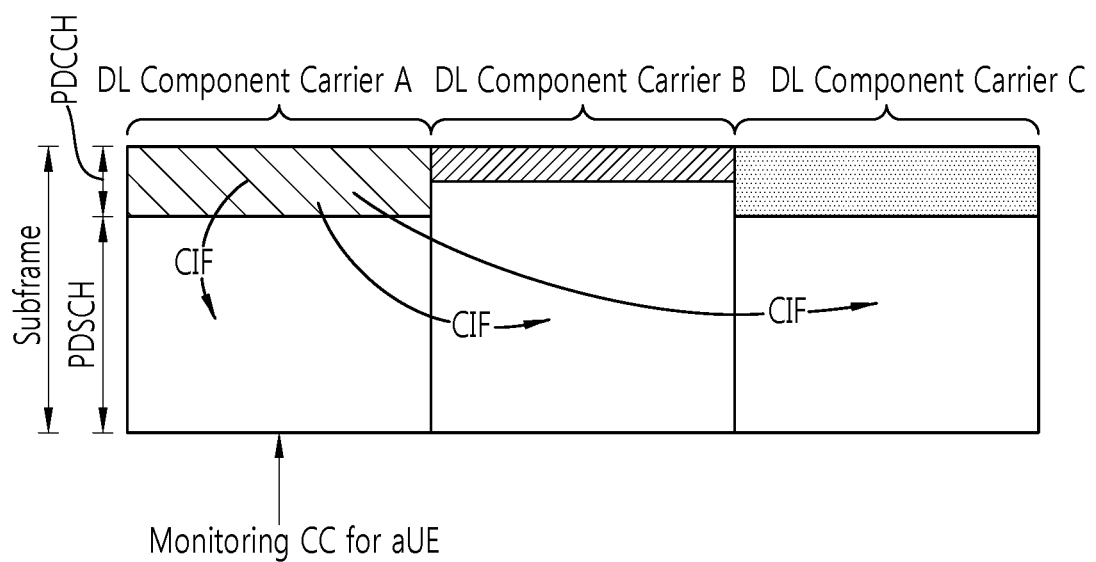
FIG. 7 exemplifies cross-carrier scheduling in the carrier aggregation system.

FIG. 7 exemplifies cross-carrier scheduling in the carrier aggregation system.

Referring to FIG. 7, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 7 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

Figure 8:
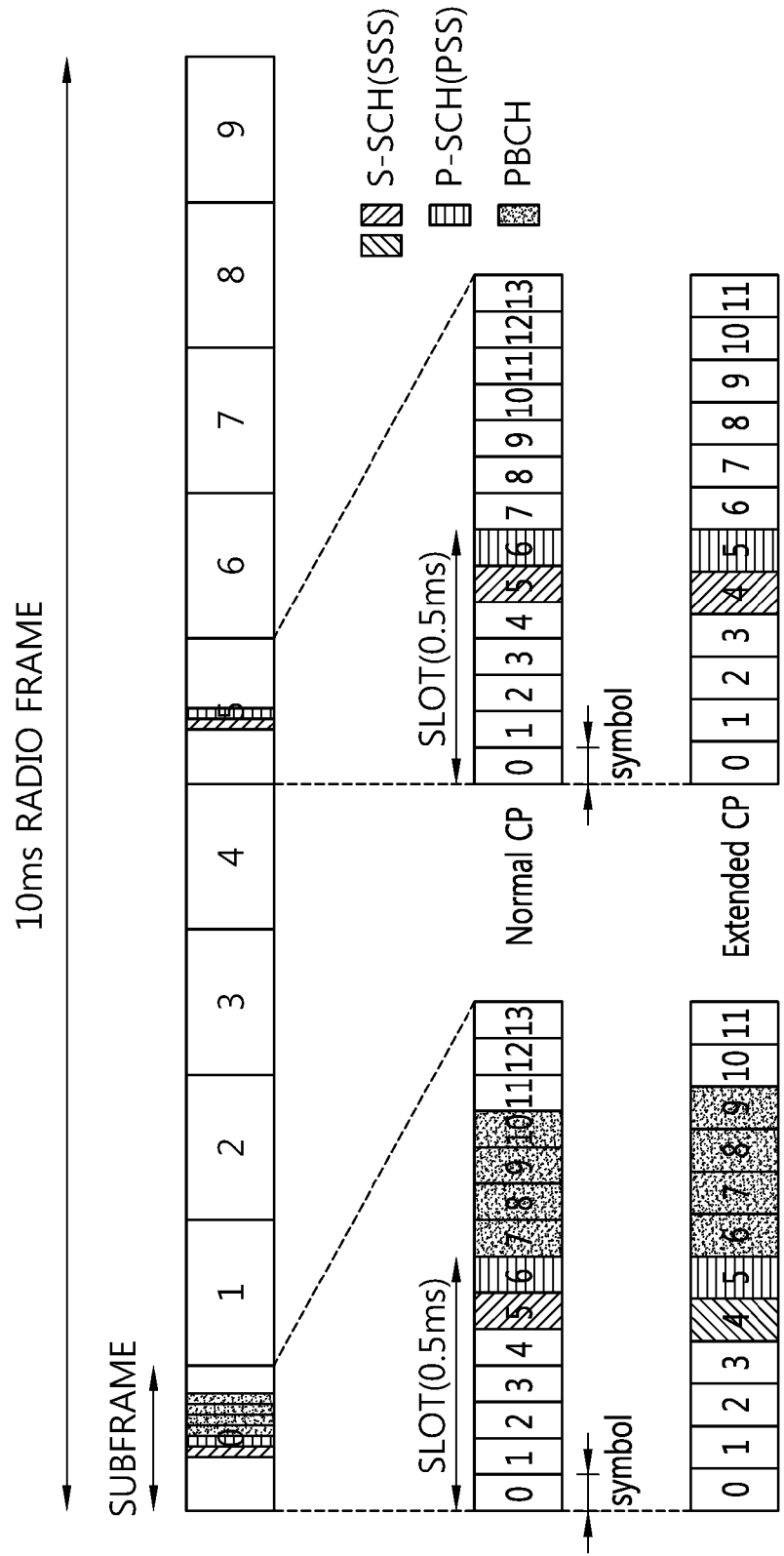
FIG. 8 shows a frame structure for transmitting a synchronization signal in the conventional FDD frame.

FIG. 8 shows a frame structure for transmitting a synchronization signal in the conventional FDD frame.

A slot number and a subframe number start from 0. A UE may adjust time and frequency synchronizations on the basis of a synchronization signal received from a BS. A synchronization signal of 3GPP LTE-A is used for cell search, and may be classified into a primary synchronization signal (PSS) and a secondary synchronization signal (SSS). The synchronization signal of 3GPP LTE-A may be found in the section 6.11 of 3GPP TS V10.2.0 (2011-06).

The PSS is used to obtain an OFDM symbol synchronization or a slot synchronization, and is associated with a physical-layer cell identity (ID) (or PCI). Further, the SSS is used to obtain a frame synchronization. In addition, the SSS is used to detect a CP length and to obtain a physical-layer cell group ID.

The synchronization signal can be transmitted in each of subframes #0 and #5 by considering a global system for mobile communication (GSM) frame length of 4.6 ms to facilitate inter-radio access technology (RAT) measurement. A boundary for the frame can be detected through the SSS. More specifically, in the FDD system, the PSS is transmitted in a last OFDM symbol of $0^{th}$ and $10^{th}$ slots, and the SSS is transmitted in an immediately previous OFDM symbol of the PSS.

The synchronization signal can transmit 504 physical cell IDs by combining 3 PSSs and 168 SSSs. A physical broadcast channel (PBCH) is transmitted in first 4 OFDM symbols of a $1^{st}$ slot. The synchronization signal and the PBCH are transmitted within 6 RBs in a system bandwidth, so as to be detected or decoded by a UE irrespective of a transmission bandwidth. A physical channel for transmitting the PSS is called a P-SCH, and a physical channel for transmitting the SSS is called an S-SCH.

Figure 9:
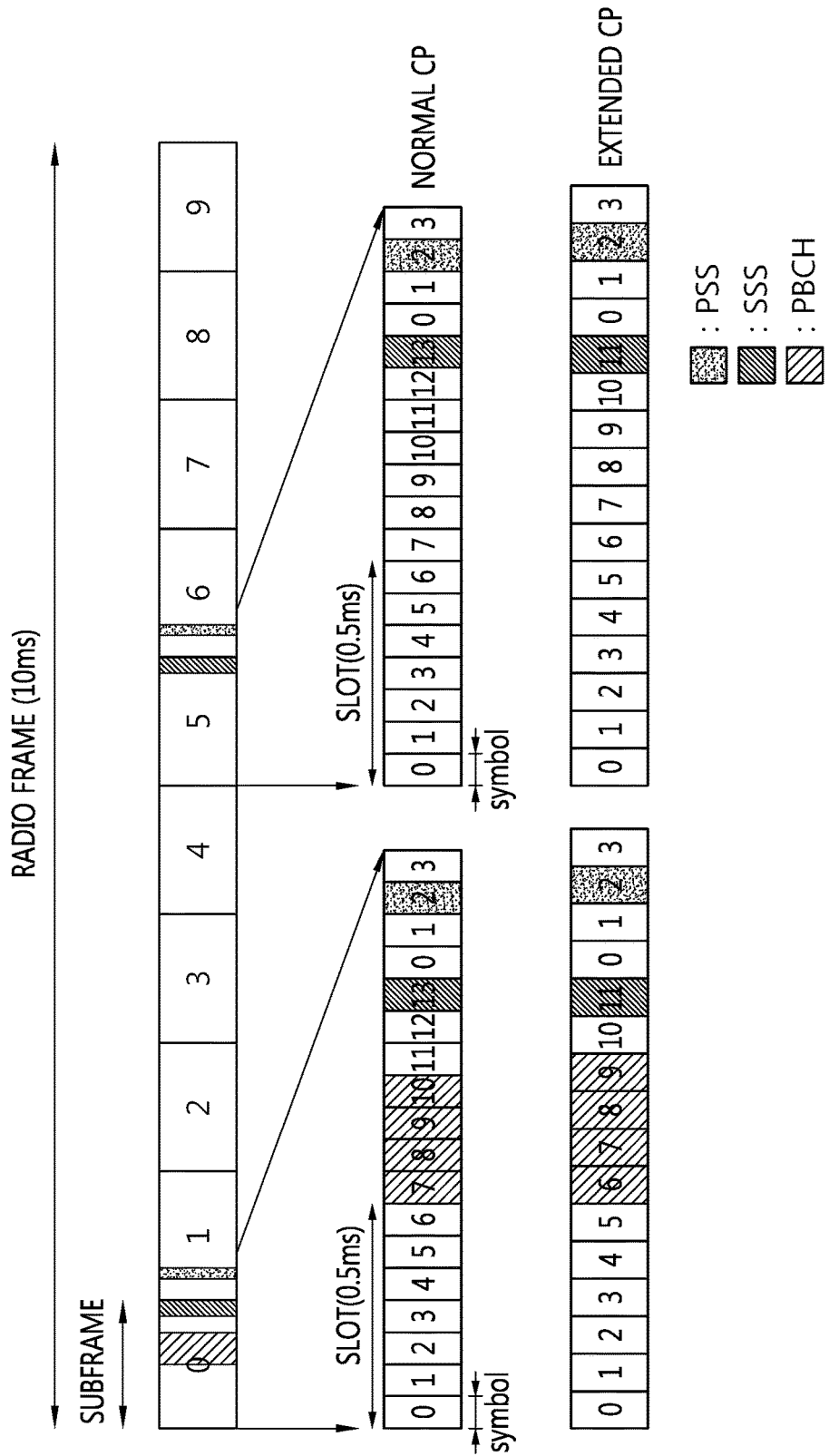
FIG. 9 shows a frame structure for transmitting a synchronization signal in a time division duplex (TDD) frame.

FIG. 9 shows a frame structure for transmitting a synchronization signal in a TDD frame.

In the TDD frame, a PSS is transmitted in a $3^{rd}$ OFDM symbol of $3^{rd}$ and $13^{th}$ slots. An SSS is transmitted three OFDM symbols earlier than the OFDM symbol in which the PSS is transmitted. A PBCH is transmitted in first 4 OFDM symbols of a $2^{nd}$ slot of a $1^{st}$ subframe.

Hereinafter, an aspect of the present invention is described.

Figure 10:
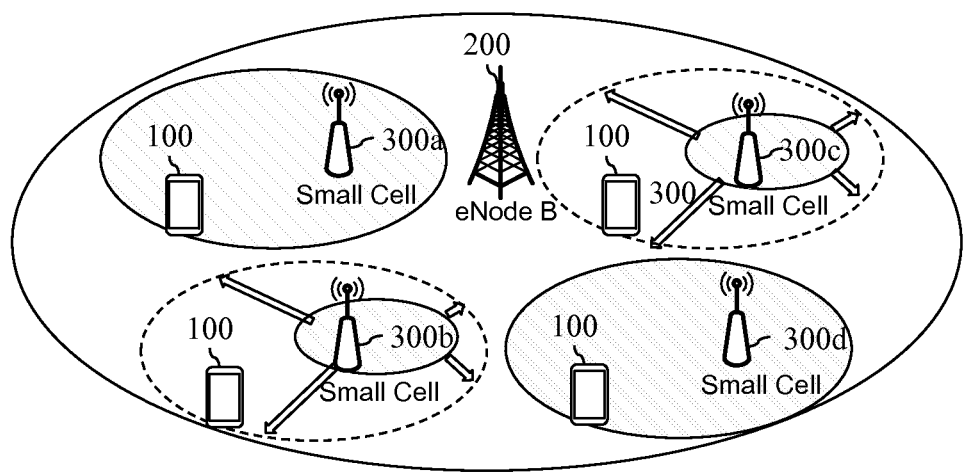
FIG. 10 shows a heterogeneous network environment in which a macro cell and a small cell co-exist and which is possibly used as a next-generation wireless communication system.

FIG. 10 shows a heterogeneous network environment in which a macro cell and a small cell co-exist and which is possibly used as a next-generation wireless communication system.

A heterogeneous network in which one or more small cells 300a, 300b, 300c, and 300d (e.g., a pico cell, a femto cell, or a micro cell) having lower-power transmit power exists in the coverage of a legacy marco cell 200 in an overlapping manner is under discussion in a next-generation communication standard including 3GPP LTE-A.

Referring to FIG. 10, the macro cell 200 may overlap with one or more small cells 300. A service of the macro cell 200 is provided by a macro eNodeB (MeNB). In the present application, the macro cell and the MeNB may be used together. A UE 100 having access to the macro cell 200 may be referred to as the macro UE 100. The marco UE 100 receives a donwlink signal from the MeNB, and transmits an uplink signal to the MeNB.

The aforementioned small cells 300a, 300b, 300c, and 300d are also referred to as a femto cell, a pico cell, or a micro cell. A service of the small cell is provided by a pico eNodeB, a home eNodeB (HeNB), a relay node (RN), etc. For convenience, the pico eNodeB, the HeNB, and the RN are collectively referred to as the HeNB. In the present application, the micro cell and the HeNB may be used together. The small cell may be divided into an open access (OA) cell and a closed subscriber group (CSG) cell according to an accessibility. The OA cell implies a cell in which the UE 100 can receive a service anytime when necessary without an additional access restriction. On the other hand, the CSG cell implies a cell in which only the authorized specific UE 100 can receive a service.

In such a heterogeneous network, an empty space in macro cell coverage can be filled by configuring the macro cell as a primary cell (Pcell) and by configuring the small cell as a secondary cell (Scell). In addition, overall performance can be boosted by configuring the small cell as the Pcell and by configuring the macro cell as the Scell.

On the other hand, the illustrated small cells 300b and 300c may extend or reduce their coverage to decrease an interference influence for other neighbor small cells 300a and 300d or the macro cell 200 according to a situation. Such coverage extension and reduction are called cell breathing. Alternatively, the small cells 300b and 300c may be on or off according to a situation.

However, when the coverage of the small cells 300b and 300c is reduced or off, disadvantageously, mobility of the UE 100 cannot be supported. In addition, if the UE 100 is in an off state or if the small cells 300b and 300c which have reduced the coverage suddenly transition to an on state or extend the coverage, confusion may occur.

Accordingly, disclosures of the present specification aim to provide a method of solving such problems.

BRIEF DESCRIPTION ON DISCLOSURES OF THE PRESENT SPECIFICATION

As described above, a plurality of small cells may be employed in a next-generation system as one method of improving performance. Further, as described above, the small cell may reduce its coverage or may be in an off state, or may be in a state in which transmission is partially or entirely restricted.

As such, even if the small cell reduces the overage or is in the off state or if transmission is partially or entirely restricted, the small cell according to the disclosures of the present specification may transmit a discovery signal to report its existence.

In addition, according to the disclosures of the present specification, the small cells may be deployed in a form of a cluster capable of mutually exchanging information. In this case, the discovery signal may also be used for reporting the existence of the cluster. The discovery signal may be transmitted not only to the UE 100 but also to other neighbor cells and the macro cell 200.

The discovery signal may also be utilized as a way of simplifying an RLM/RRM process in a situation where a plurality of cells are deployed. For example, the UE 100 may perform radio link management (RLM)/radio resource management (RRM) measurement by using a discovery signal received from any one small cell, and thereafter may utilize this RLM/RRM measurement result for the entirety of the cluster. In this case, actual measurement on each small cell in the cluster may be performed by using a cell-specific reference signal (CRS) or a tracking reference signal (TRS).

Meanwhile, according to the disclosures of the present specification, the UE 100 can acquire information (e.g., transmission timing, a PRB mapping scheme, a sequence index, etc.) for a neighbor discovery signal from a cell corresponding to a serving cell between the macro cell 200 and the small cell 300, and thus can effectively detect the discovery signal from the small cell by using the information.

Hereinafter, a method of generating information on the neighbor discovery signal transmitted by the serving cell and a method of transmitting a discovery signal on the basis of the information on the neighbor discovery signal by each small cell are described.

Figure 11A:
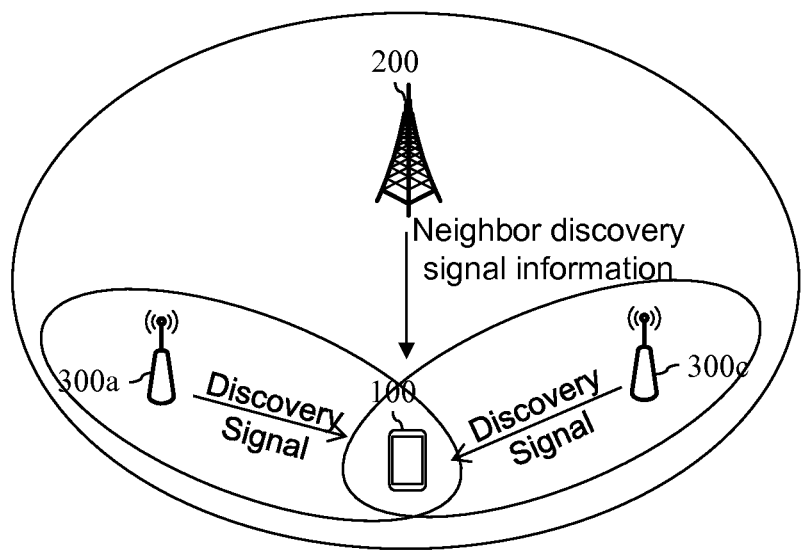
FIG. 11a and FIG. 11b show an example of a method according to a disclosure of the present specification.
Figure 11B:
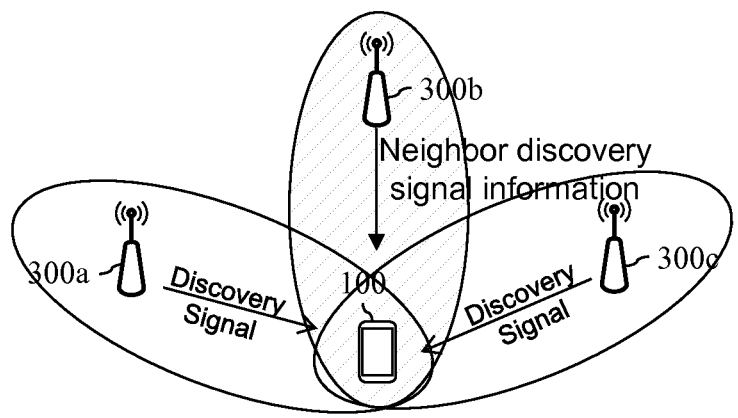

FIG. 11a and FIG. 11b show an example of a method according to a disclosure of the present specification.

Referring to FIG. 11a, a serving cell of a UE 100 is a macro cell 200, and several small cells 300a and 300c are present in the coverage of the macro cell 200. Each of the small cells 300a and 300c transmits a discovery signal. The macro cell 200 corresponding to the serving cell collects information on a neighbor discovery signal and thereafter transmits the information.

Further, referring to FIG. 11b, a serving cell of a UE 100 is a small cell 300b, and several small cells 300a and 300c are present nearby. Each of the small cells 300a and 300c transmits a discovery signal. The small cell 300b corresponding to the serving cell collects information on a neighbor discovery signal and thereafter transmits the information.

For this, each of the small cells 300a and 300c may deliver information on their discovery signals to neighbor cells.

Each of the small cells 300a and 300c may independently configure transmission timing of the discovery signal, a physical resource block (PRB), a subcarrier mapping scheme, and a parameter of a sequence for generating the discovery signal, or may configure them equally in unit of a cell cluster. Further, each of the small cells 300 and 300c may equally generate the discovery signal on the basis of a specific criterion such as cell loading, whether a control plane/user plane is supported, whether an overlap with a macro cell coverage occurs, and information for distinguishing a type of a cell in which the discovery signal is transmitted.

PRB mapping for the discovery signal may be mapping of the discovery signal to center 6 resource blocks (RBs) or to center 72 subcarriers.

Cell loading may be expressed in a ratio of total resources, e.g., a resource element (RE), and an available resource (e.g., RE) in a current cell. Alternatively, the cell loading may be expressed in a metric regarding how many UEs or traffics can be accommodated. Alternatively, cell loading information may be expressed in resource utilization (RU). In this case, it may be expressed by a representative indicator for each duration of percentage (%). For example, the cell loading information may be expressed by expressing 10% RU, 30% RU, 50% RU, and 70% RU with 2 bits.

Meanwhile, the aforementioned information on the neighbor discovery signal may also be called side information. The entirety or part of the neighbor discovery signal or side information may be reported by the macro cell 200 or small cell 300b corresponding to a service cell to the UE 100 in a cell specific manner through an upper layer signal (e.g., RRC, (e)MIB, SIB, MAC, etc.). Alternatively, the neighbor discovery signal or the side information may be semi-statically configured to the UE 100. Herein, if the neighbor discovery signal or the side information is configured in advance to the UE 100, information on the discovery signal may not be additionally provided to the UE 100.

Hereinafter, a specific example of a transmission timing of a discovery signal is described when the neighbor discovery signal or the side information is configured in advance to the UE 100.

As a first example, the transmission timing of the discovery signal may be configured as the entirety of an OFDM symbol/slot index/subframe index corresponding to transmission of a synchronization signal (SS) or as a subframe thereof. In this case, the discovery signal and the synchronization signal (SS) (or a part of the SS) may not be transmitted simultaneously.]

As a second example, the transmission timing of the discovery signal may be configured as a subset of subframes in which a CRS (or TRS) is not transmitted. In this case, the small cells may use a new carrier type (NCT). The NCT is also called an extension carrier. The NCT or the extension carrier is for mitigating interference between a plurality of cells and for improving carrier extensibility, and is expected to be employed in a next-generation system after LTE/LTE-A. In the NCT, transmission of the CRS transmitted with a fixed high density may be omitted or significantly reduced. On the contrary of a conventional case where the CRS is transmitted in all downlink subframes across a full system band, the CRS may not be transmitted in the NCT or the extension carrier or may be transmitted in a specific downlink subframe across some parts of the system band.

As a third example, the transmitting timing of the discovery signal may be configured in a form in which a slot/subframe index is shifted in the entirety of OFDM symbols corresponding to synchronization signal transmission or in a subset thereof. For example, in case of FDD, the transmission timing of the discovery signal may include a last OFDM symbol index of a slot 1. By reference, in case of FDD in a 3GPP LTE system, a PSS transmission timing includes a last OFDM symbol index of a slot 0.

In a case where neighbor discovery signal information or side information is pre-configured in advance, a discovery signal generation sequence may be configured as one or more parameters among a physical cell ID of a corresponding small cell, cell loading (e.g., RU), a cell cluster ID, a physical cell ID of a macro cell or small cell for transmitting a corresponding discovery signal, whether a dual-connectivity exists, whether a control plane/user plane is supported, whether an overlap with a macro cell coverage occurs, and information for distinguishing a type of a cell in which the discovery signal is transmitted. A period may be configured to be greater than that of the existing synchronization signal (SS), and thus UE battery saving can be achieved and an overhead increase regarding a small cell can be minimized.

On the other hand, in a case where the neighbor discovery signal information or side information is reported to the UE 100 through a higher layer signal, the neighbor discovery signal information or side information may be configured independently for each neighbor cell or all small cells in macro cell coverage or a cell cluster or each group unit configured on the basis of a specific criterion such as cell loading, whether a control plane/user plane is supported, whether an overlap with a macro cell coverage occurs, and information for distinguishing a type of a cell in which the discovery signal is transmitted. The neighbor discovery signal information or side information to be reported by the macro cell or the small cell to the UE 100 may roughly include one or more of a discovery signal transmission timing, a PRB mapping scheme for the discovery signal, a subcarrier mapping scheme, and a parameter for a discovery signal generation sequence.

The discovery signal transmission timing may be expressed in combination of: i) a subframe index/slot index/OFDM symbol index; or ii) a period/timing offset. The UE 100 may effectively manage a search space for the discovery signal by referring to the discovery signal transmission timing.

Next, information regarding PRB mapping or subcarrier mapping of the discovery signal: 1) may instruct mapping fixed to center 6 RBs or center 72 subcarriers; or 2) may be expressed as information indicating physical resource allocation similarly to a bitmap format or an RIV format.

Next, information regarding the discovery signal sequence may be expressed in combination of a sequence type (e.g., a ZC sequence, a PN sequence), a sequence index, a cyclic shift index, an OCC index, a comb index, etc.

Meanwhile, the neighbor discovery signal information or the side information may also include whether to transmit the discovery signal. The information regarding whether to transmit the discovery signal may indicate that: i) small cells always transmit the discovery signal; ii) whether to transmit the discovery signal is determined by using an on/off state of the small cell as a parameter; iii) whether to transmit the discovery signal is determined according to cell loading; or iv) whether the discovery signal is transmitted is indicated through a higher layer signal. Herein, as to a case where whether the discovery signal is transmitted is determined on the basis of the cell loading, for example, if the small cell has a sufficient space capable of accommodating the UE 100 (e.g., if a value corresponding to the number of available REs against the total number of REs is semi-static or exceeds a threshold indicated through a higher layer signal), the discovery signal may be transmitted.

On the other hand, for the neighbor discovery signal information or the side information, there may be a method in which the aforementioned information on the discovery signal is configured as a parameter set, and an index for the configured set is reported to the UE.

Figure 12:
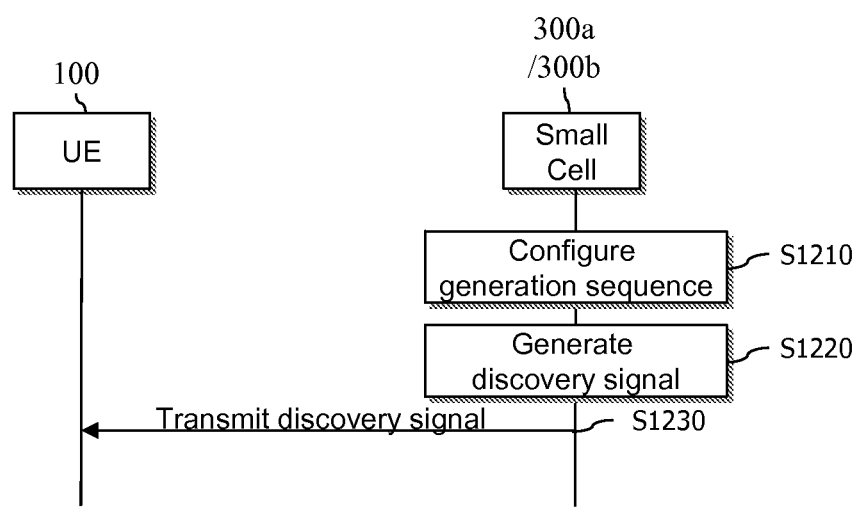
FIG. 12 is a flowchart showing a process in which a small cell generates and transmits a discovery signal according to a disclosure of the present specification.

FIG. 12 is a flowchart showing a process in which a small cell generates and transmits a discovery signal according to a disclosure of the present specification.

Referring to FIG. 12, each of the small cells 300a and 300b configures a generation sequence (S1210), generates a discovery signal by using the configured generation sequence (S1220), and transmits the generated discovery signal (S1230).

The discovery signal may include additional information so that the UE 100 can effectively perform a task such as RLM/RRM operations, handover, secondary cell addition/release, and initial cell search. For example, when the generation sequence is configured to report a connection relation between the discovery signal and corresponding small cells, a physical cell ID of the small cell or a cluster ID to which the small cell belongs may be used as a parameter.

Next, examples of information that can be used in a generation sequence for generating the discovery signal may include a physical cell ID, a cluster ID, cell loading information, access type information, a cyclic prefix (CP) length, priority information of a cell, etc. Herein, the access type may imply a type of a UE that can be connected to a corresponding small cell or may imply a type of the small cell. Alternatively, the access type may imply a backhaul condition of the small cell. Herein, the type of the small cell may imply one or more of whether a dual-connectivity is supported, whether an overlap with a macro cell coverage occurs, information regarding a type of a cell, and whether a control plane/user plane is supported. If the control plane is not supported in a corresponding small cell, UEs currently connected to the small cell may be configured not to transmit RACH. In addition, if the small cell does not support the control plane, information regarding a different cell (e.g., a different small cell or a macro cell) supporting the control plane may be additionally delivered to the UE 100. The information regarding the different cell supporting the control pane may include a physical cell ID of a corresponding small cell, a carrier frequency of the small cell, etc. The backhaul condition may independently configure information between small cells in a cluster, information between small cells in a specific region, and information between a macro cell and a small cell. The priority information of the cell may be used to increase a probability or density that the UE camps on or is connected to a small cell which transmits a corresponding discovery signal when performing cell search. A priority of the cell may be configured to be increased through indication information. Alternatively, the priority of the cell may be configured to be increased by adding a bias value to a value for the small cell or by directly setting the bias value when performing RLM/RRM measurement such as reference signal received power (RSRP)/reference signal received quality (RSRQ) or discovery signal received power (DSRP)/discovery signal received quality (DSRQ). In this case, the discovery signal transmitted by the small cell may include some parts of the aforementioned information or a combination thereof.

Meanwhile, a transmission timing, a PRB mapping scheme, or the like must be configured after the generation sequence configuration process (S1210). The sequence configuration may be expressed in combination of a sequence type, a sequence index, a cyclic shift index, an OCC index, a comb index, etc.

Meanwhile, examples in which a UE utilizes information included in the discovery signal are described hereinafter in detail.

In a case where the discovery signal is generated by using a physical cell ID as a parameter, the discovery signal may be simplified in the following manner in order to improve detection performance for the discovery signal. The physical cell ID may be partitioned into M parts, and thereafter M partition indexes may be utilized in the discovery signal. Alternatively, candidates of an SSS may be partitioned into M parts, and thereafter M partition indexes may be utilized in the discovery signal.

An example on a case where the discovery signal is generated by using a cluster ID as a parameter is described as follows. First, when the cluster ID is assigned, a correlation or the like between small cells belonging thereto may be taken into consideration. Alternatively, when the cluster ID is assigned, a physical cell ID or the like of small cells belonging to a cluster may be taken into consideration.

An example on a case where the discovery signal is generated by using cell loading (e.g., RU) as a parameter is described as follows. The discovery signal may be configured by using the total number of REs and the number of REs currently being used or reserved, and the number of REs currently not being used or reserved as a parameter. The parameter for the cell loading may be expressed with a ratio of the number of REs currently not being used or reserved and the total number of REs.

An example on a case where the discovery signal is generated by using an access type as a parameter is described as follows. The discovery signal may be generated by using whether a UE supports a small cell, whether the UE can support CA, whether the UE can support NCT, a TM (or a TM set) which is currently being used or can be supported by the small cell, whether a control plane/user plane is supported, whether a dual-connectivity is supported, a CP that can be supported by the UE (e.g., whether a shortened CP can be supported), whether an eIMTA/different TDD can be supported/used by the UE and/or cell, a frame structure type (e.g., FDD/TDD) currently being used, whether the small cell for transmitting the discovery signal is located in macro cell coverage, etc.

An example on a case where the discovery signal is generated by using a CP length as a parameter is described as follows. The discovery signal may be generated differently depending on a normal CP, an extended CP, a third CP (e.g., a shortened CP), etc.

Meanwhile, if it is a situation where the cell loading satisfies a specific condition (e.g., if an RU value is less than a specific threshold) or if a corresponding small cell does not support a control plane, the small cell may not transmit the discovery signal or may be configured to transmit the discovery signal relatively later than other cells.

On the other hand, the number of times of performing blind decoding to detect the discovery signal may be increased according to an amount of information included in the discovery signal, which may lead to detection performance deterioration. As a method of improving this, a small cell may transmit a broadcast signal in a form of an extended PBCH together when transmitting the discovery signal. A part of information to be included in the discovery signal may be transmitted instead, through the extended PBCH. Alternatively, the information to be included in the discovery signal may be transmitted instead, through an additional PDSCH and a physical downlink channel.

Figure 13:
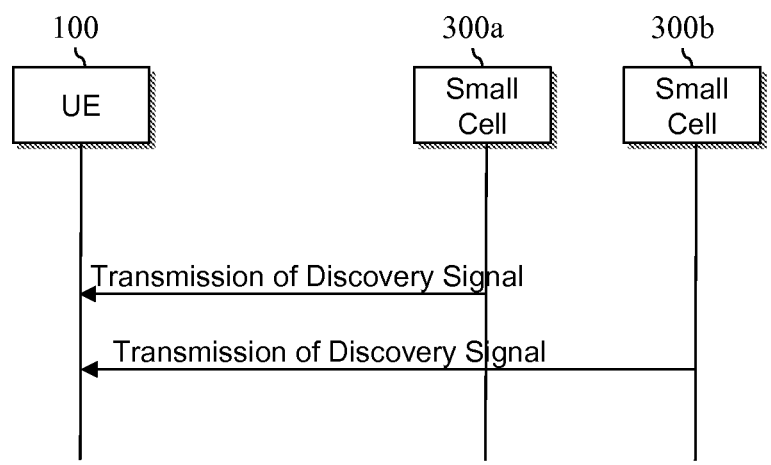
FIG. 13 shows an example in which several small cells transmit a discovery signal according to a disclosure of the present specification.

FIG. 13 shows an example in which several small cells transmit a discovery signal according to a disclosure of the present specification.

As illustrated, each of small cells 300a and 300b may transmit the discovery signal independently, or may transmit the discovery signal in unit of a cluster. A transmission timing of the discovery signal may be configured according to the aforementioned neighbor discovery signal information or side information. For example, the transmission timing may be configured by using a physical cell ID of the small cells 300a and 300b, a cluster ID, cell loading information, whether a control plane/user plane is supported, whether macro cell coverage is present, information for distinguishing a type of a cell in which the discovery signal is transmitted as a parameter. Alternatively, even if a physical cell ID and a synchronization signal (SS) (e.g., PSS or SSS) are different between the small cells 300a and 300b, the small cells 300a and 300b may transmit the same discovery signal (sequence). In this case, all or some of cells for transmitting the same discovery signal (sequence) may be aggregated with the cluster.

Meanwhile, if the small cells 300a and 300b transmit respective discovery signals at the same timing, the UE 100 can detect all of the discovery signals at a time, thereby having a battery saving effect.

However, if the several small cells 300a and 300b perform transmission at the same timing as described above, a possibility that the discovery signals collide with each other may be increased.

Accordingly, in a next-generation system, a collision can be avoided even if the discovery signal is transmitted during a plurality of OFDM symbols or subframes by applying code division multiplexing (CDM) to the discovery signal. In this case, whether synchronization is correctly achieved between the small cells 300a and 300b may have a great effect on signal detection/identification performance of the UE 100. Accordingly, a CP length for the discovery signal may be determined to be longer than another physical channel (e.g., PUSCH, PDSCH, PDCCH, etc.). Discovery signals (sequences) transmitted at the same transmission timing may be identified with each other by utilizing a combination of a cyclic shift and an orthogonal cover code (OCC). Herein, information on the cyclic shift and/or an OCC index may be delivered to the UE 100 by being included in the aforementioned neighbor discovery signal information or side information. The OCC may be applied across a plurality of OFDM symbol indexes, slot indexes, and subframe indexes, and in addition thereto, may also be extended through a frequency domain (e.g., PRB, subcarrier).

Hereinafter, an example of applying a cyclic shift and an OCC is described in detail when CDM is applied to a discovery signal in a time domain.

As a first example, a root discovery signal sequence is generated for a single OFDM symbol. Thereafter, the root discovery signal sequence is extended for N OFDM symbols by using the OCC.

As a second example, a root discovery signal sequence for a single OFDM symbol is generated. Thereafter, a cyclic shift index is applied independently to each of N OFDM symbols, and the root discovery signal sequence is extended by using the OCC again.

As a third example, a root discovery signal sequence is generated with a length corresponding to N OFDM symbols. Thereafter, a single cyclic shift is applied to the root discovery signal sequence.

Meanwhile, the N OFDM symbols may correspond to indexes of OFDM symbols capable of transmitting the discovery signal. In addition, although the N OFDM symbols may exist in the same slot or the same subframe, the N OFDM symbols may also exist across a plurality of slots or subframes. The OFDM symbol indexes may be selected according to a purpose of RLM/RRM which utilizes the discovery signal.

On the other hand, the plurality of discovery signals may be transmitted at different transmission timings. For this, an offset may exist between the transmission timings. Therefore, the plurality of discovery signals may be identified through a timing offset. Herein, the timing offset may be configured in unit of an OFDM symbol index, a slot index, a subframe index, or a frame index, and a corresponding value thereof may be delivered to the UE 100 by being included in the aforementioned neighbor discovery signal information or side information.

Hereinafter, examples of a method of configuring a transmission timing are described in detail.

As a first example, a timing and/or an OCC index may be configured by using a physical cell ID, which corresponds to the small cells 300a and 300b for transmitting a corresponding signal, as a parameter. This is to avoid a collision between discovery signals in small cells densely present nearby. An example of utilizing the physical cell ID may include a case where: i) the physical cell ID is partitioned into M parts and thereafter the M partitioned indexes are utilized when a timing offset is configured; and ii) candidates of an SSS are partitioned into M parts, and thereafter M partitioned indexes are utilized when a timing offset is configured. According thereto, since there is a correlation between the discovery signal and the small cells 300a and 300b, complexity can be decreased in a process in which the UE detects an SS.

As a second example, a timing offset and/or an OCC index may be configured by using a cluster ID, to which the small cells 300a and 300b for transmitting a corresponding signal belong, as a parameter. The cluster ID may be pre-defined together with small cells 300a and 300b belonging thereto, and may be configured by using a physical cell ID of the small cells 300a and 300b belonging thereto as a parameter. The small cells 300a and 300b in the same cluster may transmit a discovery signal at the same transmission timing. If the small cells 300a and 300b belonging to the same cluster transmit the same discovery signal (sequence), the UE 100 may perform RLM/RRM in unit of a cluster.

As a third example, a timing offset and/or an OCC index are configured by using cell loading (or information related to the cell loading) as a parameter. For example, according to capability capable of accommodating a UE by a small cell or capability capable of accommodating new traffic (e.g., the number of extra REs or a ratio thereof), the timing offset may be configured in an ascending/descending order. If specific accommodating capability is not enough (e.g., if the number of extra REs or a ratio thereof is less than a determined threshold), it may be considered not to transmit the discovery signal. In doing so, the UE is allowed to receive the discovery signal only from cells capable of handling data traffic and to perform an RLM/RRM operation or the like at a later time.

As a fourth example, a timing offset and/or an OCC index may be configured by using an access class as a parameter.

The access class implies a class of a UE that can be connected to a corresponding small cell. This is to allow the UE to receive a discovery signal only for a small cell to which the UE can be connected at a later time according to the UE class (hereinafter, a UE category, an XX-enabled UE).

The aforementioned four examples may be combined with each other. That is, the timing offset and/or the OCC index may be configured on the basis of a plurality of parameters. In addition, when a plurality of discovery signals are transmitted at the same transmission timing, the aforementioned CDM scheme and timing offset scheme may be combined.

Meanwhile, the UE which receives the discovery signal may measure RSRP/RSRQ or the like for RLM/RRM or the like for each small cell, or may perform measurement for each cluster. Herein, the RSRP may be named other terms such as discovery signal received power (DSRP), and the RSRQ may be named other terms such as discovery signal received quality (DSRQ). If the UE performs measurement in unit of a cluster, there is a need to perform RLM/RRM or the like on each small cell belonging to the cluster for the purpose of an initial access, handover, secondary cell addition, dual-connectivity/multiple connectivity, or the like with respect to each small cell in practice at a later time. For this, a reference signal for the RLM/RMM may be transmitted also in a cell-off state in which the entirety or part of the reference signal is not transmitted at a time of transmitting the discovery signal. Herein, the reference signal for the RLM/RRM may be a CRS (or TRS).

Hereinafter, an example of a method of transmitting a CRS (or TRS) together at a time of transmitting a discovery signal is described.

As a first example, in a subframe in which the entirety or part of the discovery signal is transmitted, the small cell can transmit the CRS (or TRS) even if a corresponding small cell is off or even if the TRS is not transmitted in NCT.

As a second example, in a subframe corresponding to a start point with respect to a subframe in which the entirety or part of the discovery signal is transmitted, the small cell can transmit the CRS (or TRS) even if a corresponding small cell is off during a duration from previous K subframes to next K subframes at a time at which the discovery signal ends or even if the TRS is not transmitted in NCT. In case of the TRS, it may be considered to configure a value K such that the TRS exists during the subframe duration.

As a third example, in a subframe in which the entirety or part of the discovery signal is transmitted, a reference signal can be transmitted even if a corresponding small cell is off or even if the TRS is not transmitted in NCT. The reference signal may be a CRS (or TRS) or a CSI-RS, and may be a DMRS. The reference signal may be transmitted at the same timing as a transmission timing of the discovery signal.

The aforementioned embodiments of the present invention can be implemented through various means. For example, the embodiments of the present invention can be implemented in hardware, firmware, software, combination of them, etc. Details thereof will be described with reference to the drawing.

Figure 14:
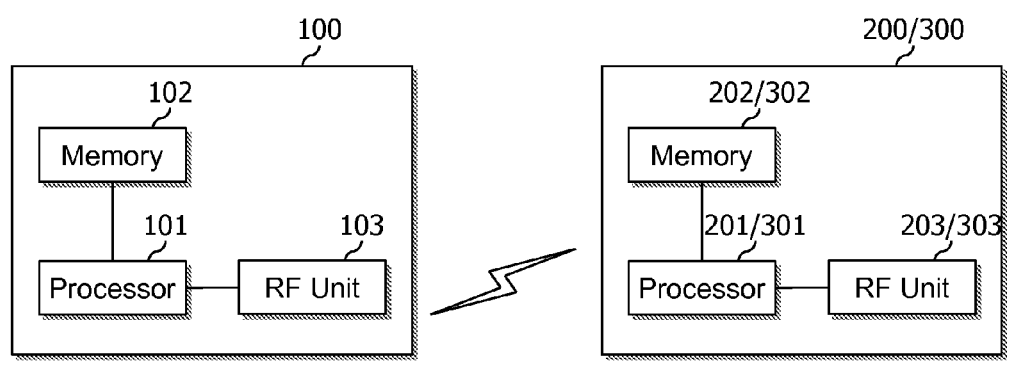
FIG. 14 is a block diagram showing a wireless communication system according to a disclosure of the present specification.

FIG. 14 is a block diagram showing a wireless communication system according to a disclosure of the present specification.

BSs 200 and 300 include processors 201 and 301, memories 202 and 302, and radio frequency (RF) units 203 and 303. The memories 202 and 302 coupled with the processors 201 and 301 store a variety of information for driving the processors 201 and 301. The RF units 203 and 303 coupled to the processors 201 and 301 transmit and/or receive radio signals. The processors 201 and 301 implement the proposed functions, procedures, and/or methods. In the aforementioned embodiment, an operation of the BS may be implemented by the processors 201 and 301.

A UE 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for detecting a cell, the method performed by a user equipment (UE) and comprising:
   receiving, from a serving cell, information on discovery signals from a plurality of neighbor cells; and
   detecting discovery signals from one neighbor cell or a plurality of neighbor cells in an off state based on the information on the discovery signals,
   wherein the UE does not expect physical channels other than the discovery signals from the one neighbor cell or the plurality of neighbor cells in the off state,
   wherein the information on the discovery signals includes:
      a transmission timing of a discovery signal among the discovery signals,
      a subframe offset from a synchronization signal (SS), and
      one or more of:
         information on whether a corresponding cell transmits a discovery signal with a specific period,
         information on whether the discovery signal is transmitted according to an on or off state of the cell,
         information on whether the discovery signal is transmitted according to loading of the cell, and
         information on whether a transmission status indicating whether transmission is performed or not is reported through a higher layer signal.

2. The method of claim 1, wherein the information on the discovery signal further includes one or more of physical resource block (PRB) mapping of the discovery signal, subcarrier mapping of the discovery signal, a generation sequence parameter of the discovery signal, cell loading, whether a control plane/user plane is supported, whether an overlap with a macro cell coverage occurs, and information for distinguishing a type of a cell in which the discovery signal is transmitted.

3. The method of claim 1, wherein the discovery signals are generated based on at least one of a physical cell identifier (ID), a cluster ID, an access type, a cyclic prefix (CP) length, priority information of a cell, and information on cell loading.

4. The method of claim 3, wherein the information on cell loading is a resource usage rate, and the discovery signals are generated differently according to the resource usage rate.

5. The method of claim 3, wherein if the plurality of the neighbor cells belong to one cluster, the plurality of the neighbor cells generate the same discovery signals based on the cluster ID.

6. The method of claim 1, wherein the discovery signals are received at the same timing from the plurality of neighbor cells.

7. The method of claim 1, further comprising:
performing measurements based on the discovery signals.

8. The method of claim 1, wherein the discovery signals are received together with a reference signal.

9. A user equipment (UE) for detecting a cell, the UE comprising:
a transceiver; and
a processor operatively connected to the transceiver, wherein the processor is configured to:
control the transceiver to receive, from a serving cell, information on discovery signals from a plurality of neighbor cells; and
detect discovery signals from one neighbor cell or a plurality of neighbor cells in an off state based on the information on the discovery signals,
wherein the UE does not expect physical channels other than the discovery signals from the one neighbor cell or the plurality of neighbor cells in the off state,
wherein the information on the discovery signals includes:
a transmission timing of a discovery signal among the discovery signals,
a subframe offset from a synchronization signal (SS), and
one or more of:
information on whether a corresponding cell transmits a discovery signal with a specific period,
information on whether the discovery signal is transmitted according to an on or off state of the cell,
information on whether the discovery signal is transmitted according to loading of the cell, and
information on whether a transmission status indicating whether transmission is performed or not is reported through a higher layer signal.

10. The UE of claim 9, wherein the processor is further configured to:
perform measurements based on the discovery signals.

11. The UE of claim 9, wherein the discovery signals are received together with a reference signal.

* * * * *